United States Patent
Ahmed et al.

(10) Patent No.: US 12,508,569 B1
(45) Date of Patent: Dec. 30, 2025

(54) MULTIPHASE NANOCOMPOSITE MATERIAL

(71) Applicant: IMAM MOHAMMAD IBN SAUD ISLAMIC UNIVERSITY, Riyadh (SA)

(72) Inventors: Ehab Abdelhamed Abdelrahman Ahmed, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/211,915

(22) Filed: May 19, 2025

(51) Int. Cl.
| | |
|---|---|
| B01J 20/02 | (2006.01) |
| B01J 20/04 | (2006.01) |
| B01J 20/20 | (2006.01) |
| B01J 20/28 | (2006.01) |
| B01J 20/30 | (2006.01) |

(52) U.S. Cl.
CPC ......... B01J 20/024 (2013.01); B01J 20/0274 (2013.01); B01J 20/041 (2013.01); B01J 20/20 (2013.01); B01J 20/28011 (2013.01); B01J 20/28016 (2013.01); B01J 20/3078 (2013.01)

(58) Field of Classification Search
CPC .... B01J 20/024; B01J 20/0274; B01J 20/041; B01J 20/20; B01J 20/28011; B01J 20/28016; B01J 20/3078
See application file for complete search history.

(56) References Cited

U.S. PATENT DOCUMENTS

2022/0102660 A1* 3/2022 Lee .................. H10K 85/50
2022/0399160 A1* 12/2022 Hirukawa .......... H01F 17/0013

FOREIGN PATENT DOCUMENTS

| CN | 114804189 A | * | 7/2022 | ........... G01N 27/127 |
| CN | 115160648 A | * | 10/2022 | ................ C08K 3/38 |
| CN | 116408093 B | * | 8/2024 | ............... B01J 35/39 |
| JP | 4590874 B2 | * | 12/2010 | |

OTHER PUBLICATIONS

Saleem et al. (Physics B, 2015, 16-20) (Year: 2015).*
Guo et al. (CN114804189A English) (Year: 2022).*
Zhang et al. (CN115160648A English) (Year: 2022).*
Das et al. J. Mag. and Mag. Mat. 2018, 451, 526-531 (Year: 2018).*
Silke Busche, et al., "Synthesis and Crystal Structure of Zinc Borate Oxides Containing Isolated Trigonal Planar BO3 Units: Zn5Mn(BO3)2O4 and ZnFe(BO3)O", Zeitschrift fuer Naturforschung B, vol. 50b, Issue 10, Apr. 25, 1995, pp. 1450-1454, Only Abstract in English.

* cited by examiner

Primary Examiner — Michael B Cleveland
Assistant Examiner — Jordan W Taylor
(74) Attorney, Agent, or Firm — Oblon, McClelland, Maier & Neustadt, L.L.P.

(57) ABSTRACT

A $ZnFe(BO_3)O/Fe_2CaO_4/C$ nanocomposite material includes an orthorhombic zinc iron borate oxide ($ZnFe(BO_3)O$) phase and an orthorhombic iron calcium oxide ($Fe_2CaO_4$) phase. The $ZnFe(BO_3)O/Fe_2CaO_4/C$ nanocomposite material includes irregularly shaped granular and flake-like particles. Further, a method of producing the $ZnFe(BO_3)O/Fe_2CaO_4/C$ nanocomposite material includes calcining metal precursors.

20 Claims, 5 Drawing Sheets

— 50

Add an ammonium tartrate solution to a solution comprising $Fe(NO_3)_3 \cdot 9H_2O$, $Zn(NO_3)_2 \cdot 6H_2O$, $Ca(NO_3)_2 \cdot 4H_2O$ and boric acid under stirring to form a reaction mixture — 52

Add triethylene glycol to the reaction mixture to form a stabilized mixture and stir at 250 °C until a solid is formed — 54

Calcine the solid at a temperature in a range from 600 to 800 °C for 1 to 5 hours to form the $ZnFe(BO_3)O/Fe_2CaO_4/C$ nanocomposite material — 56

MULTIPHASE NANOCOMPOSITE MATERIAL

BACKGROUND

Technical Field

The present disclosure is directed towards nanocomposite materials, and more particularly, relates to a $ZnFe(BO_3)O/Fe_2CaO_4/C$ nanocomposite material and a method of production thereof.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Nanomaterials have gained attention due to their often high surface area, tunable porosity, and enhanced mechanical, thermal, and chemical properties, making them valuable for applications in catalysis, energy storage, electronic devices, and biomedical fields. The integration of nanomaterials into nanocomposites has further expanded their utility, allowing for tailored electrical, optical, and catalytic properties through controlled nanoscale interactions. In comparison to single-phase and binary composites, advanced multiphase nanocomposites provide enhanced control over morphology, crystallinity, and porosity. This has driven increasing research efforts to develop effective multiphase nanocomposite materials.

Various synthesis methods, including hydrothermal, sol-gel, and solid-state reactions, have been explored to fabricate nanocomposites with improved functional attributes. However, conventional approaches often face challenges such as non-uniform phase distribution, uncontrolled particle size, agglomeration, and inadequate porosity, limiting their efficiency in high-performance applications. In contrast, the sol-gel method facilitates the integration of multiple crystalline phases, leading to enhanced mechanical stability and multifunctional performance. Despite these advantages, drawbacks such as high-temperature requirements, complex synthesis protocols, and difficulty in maintaining structural stability persist. Additionally, achieving a balance between porosity, conductivity, and durability remains a challenge in current nanocomposite fabrication strategies.

A comparative evaluation of material combinations highlights the need for innovative approaches to overcome existing limitations. While titanium oxide-based materials have been extensively studied, their restricted phase control and porosity hinder their potential in advanced applications. The development of hybrid nanocomposites incorporating diverse nanomaterials, such as metal oxides, carbon-based structures, and polymeric frameworks, has shown promise in addressing these challenges. However, finding synthesis conditions to achieve enhanced phase stability and functional integration remains an area requiring further research.

Advances in multiphase nanocomposite generation have shown promise by enabling precise control over phase composition, morphology, and porosity. However, limitations continue to hinder widespread implementation. Synthesis methodologies used to refine material properties and provide enhanced performance across diverse applications including energy conversion, biomedicine, and next-generation electronic devices are still needed.

Accordingly, one object of the present disclosure is to provide a multiphase nanocomposite material, and a method of synthesis thereof, that may circumvent the drawbacks and limitations, such as, high energy consumption, lengthy processing times, costly precursors, agglomeration, and scalability issues, of existing materials and methods known in the art.

SUMMARY

In an exemplary embodiment, a $ZnFe(BO_3)O/Fe_2CaO_4/C$ nanocomposite material is described. The $ZnFe(BO_3)O/Fe_2CaO_4/C$ nanocomposite material includes an orthorhombic zinc iron borate oxide ($ZnFe(BO_3)O$) phase and an orthorhombic iron calcium oxide ($Fe_2CaO_4$) phase. The $ZnFe(BO_3)O/Fe_2CaO_4/C$ nanocomposite material includes irregularly shaped granular and flake-like particles.

In some embodiments, the $ZnFe(BO_3)O/Fe_2CaO_4/C$ nanocomposite material has an oxygen (O) content in a range from 40 atomic percent (at. %) to 80 at. %, a calcium (Ca) content in a range from 1 at. % to 20 at. %, an iron (Fe) content in a range from 5 at. % to 25 at. %, a boron (B) content in a range from 1 at. % to 20 at. %, a zinc (Zn) content in a range from 0.5 at. % to 15 at. %, and a carbon (C) content in a range from 0.5 at. % to 25 at. % based on the total number of atoms in the $ZnFe(BO_3)O/Fe_2CaO_4/C$ nanocomposite material.

In some embodiments, the $ZnFe(BO_3)O/Fe_2CaO_4/C$ nanocomposite material has an oxygen content in a range from 50 at. % to 70 at. %, a calcium content in a range from 1 at. % to 15 at. %, an iron content in a range from 8 at. % to 20 at. %, a boron content in a range from 1 to 15 at. %, a zinc content in a range from 0.5 at. % to 10 at. %, and a carbon content in a range from 0.5 at. % to 20 at. % based on the total number of atoms in the $ZnFe(BO_3)O/Fe_2CaO_4/C$ nanocomposite material.

In some embodiments, the $ZnFe(BO_3)O/Fe_2CaO_4/C$ nanocomposite material has an oxygen content in a range from 55 at. % to 65 at. %, a calcium content in a range from 5 at. % to 10 at. %, an iron content in a range from 10 at. % to 18 at. %, a boron content in a range from 3 at. % to 12 at. %, a zinc content in a range from 1 at. % to 8 at. %, and a carbon content in a range from 1 at. % to 15 at. % based on the total number of atoms in the $ZnFe(BO_3)O/Fe_2CaO_4/C$ nanocomposite material.

In some embodiments, the $ZnFe(BO_3)O/Fe_2CaO_4/C$ nanocomposite material has an oxygen content in a range from 57 at. % to 63 at. %, a calcium content in a range from 6 at. % to 9 at. %, an iron content in a range from 12 at. % to 16 at. %, a boron content in a range from 5 at. % to 9 at. %, a zinc content in a range from 3 at. % to 7 at. %, and a carbon content in a range from 2 at. % to 10 at. %.

In some embodiments, the $ZnFe(BO_3)O/Fe_2CaO_4/C$ nanocomposite material has an average crystallite size in a range from 40 nanometer (nm) to 95 nm.

In some embodiments, the $ZnFe(BO_3)O/Fe_2CaO_4/C$ nanocomposite material has an average crystallite size in a range from 50 nm to 85 nm.

In some embodiments, the $ZnFe(BO_3)O/Fe_2CaO_4/C$ nanocomposite material has an average crystallite size in a range from 55 nm to 75 nm.

In some embodiments, the $ZnFe(BO_3)O/Fe_2CaO_4/C$ nanocomposite material has an average crystallite size in a range from 65 nm to 70 nm.

In another exemplary embodiment, a method for making the $ZnFe(BO_3)O/Fe_2CaO_4/C$ nanocomposite material is described. The method includes adding an ammonium tartrate solution to a solution including $Fe(NO_3)_3 \cdot 9H_2O$, $Zn(NO_3)_2 \cdot 6H_2O$, $Ca(NO_3)_2 \cdot 4H_2O$ and boric acid ($H_3BO_3$) under stirring to form a reaction mixture. Further, the method includes, adding triethylene glycol (TEG, $C_6H_{14}O_4$) to the reaction mixture to form a stabilized mixture and stirring at 250° C. until a solid is formed, and calcining the solid at a temperature in a range from 600° C. to 800° C. for 1 hour to 5 hours to form the $ZnFe(BO_3)O/Fe_2CaO_4/C$ nanocomposite material.

In some embodiments, the concentration of ammonium tartrate in the reaction mixture is in a range from 40 grams per liter (g/L) to 70 g/L.

In some embodiments, the concentration of $Fe(NO_3)_3 \cdot 9H_2O$ in the reaction mixture is in a range from 20 g/L to 40 g/L.

In some embodiments, the concentration of $Zn(NO_3)_2 \cdot 6H_2O$ in the reaction mixture is in a range from 5 g/L to 15 g/L.

In some embodiments, the concentration of $Ca(NO_3)_2 \cdot 4H_2O$ in the reaction mixture is in a range from 5 g/L to 15 g/L.

In some embodiments, the concentration of boric acid in the reaction mixture is in a range from 15 g/L to 25 g/L.

In some embodiments, the concentration of triethylene glycol in the stabilized mixture is in a range from 30 milliliters per Liter (mL/L) to 40 mL/L of stabilized mixture.

In some embodiments, the solid is calcined at a temperature in a range from 650° C. to 750° C.

In some embodiments, the solid is calcined at a temperature of 700° C.

In some embodiments, the solid is calcined for 2 hours to 4 hours.

In some embodiments, the solid is calcined for 3 hours.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

When describing the present disclosure, the terms used are to be construed in accordance with the following definitions, unless a context dictates otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of '25 degrees Celsius (° C.)±3° C. in the present disclosure.

As used herein, the term 'nanoparticles (NPs)' refers to particles having a particle size of 1 nanometer (nm) to 1000 nm within the scope of the present disclosure.

As used herein, the term 'nanocomposite' refers to a composite material that has at least one component with a grain size measured in nanometers.

As used herein, the term 'porosity' refers to a measure of the void or vacant spaces within a material.

As used herein, the term 'pore diameter' refers to an average width or size of the pores (void spaces) within a material, typically measured in nm or angstroms (Å). It is a parameter in characterizing the texture and permeability of porous materials, influencing their adsorption, filtration, or catalytic properties. The pore diameter is often determined using methods such as nitrogen adsorption or mercury intrusion, which provide insights into the material's ability to absorb or interact with molecules of specific sizes.

As used herein, the term 'pore volume' refers to the total volume of void spaces (pores) within a material that is capable of being filled by a gas or liquid. It is typically expressed in cubic centimeters per gram ($cm^3/g$) and is a parameter in characterizing the porous structure of materials, such as adsorbents or catalysts.

As used herein, the term 'average particle size' refers to the mean diameter of nanoparticles in a sample, typically calculated from measurements obtained using techniques such as scanning electron microscopy (SEM) or transmission electron microscopy (TEM), representing the typical size of the particles in the distribution.

As used herein, the term 'average crystallite size' refers to the mean size of crystalline regions in a material, typically determined through X-ray diffraction (XRD) analysis, and represents the size of the individual crystal domains within the sample, excluding any amorphous material.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

An aspect of the present disclosure is directed to a $ZnFe(BO_3)O/Fe_2CaO_4/C$ nanocomposite using the Pechini sol-gel method, providing precise control over its structural and compositional properties. The method enables the formation of orthorhombic phases with nanoscale dimensions, making it suitable for advanced applications.

A $ZnFe(BO_3)O/Fe_2CaO_4/C$ nanocomposite material (also referred to as a nanocomposite or nanocomposite material) is described. The nanocomposite material includes an orthorhombic $ZnFe(BO_3)O$ phase, and an orthorhombic $Fe_2CaO_4$ phase. In some embodiments, the nanocomposite material may include other crystalline phases such as but not limited to quartz, calcite, hematite, magnetite, goethite, dolomite, albite, anorthite, pyrite, fluorite, halite, barite, apatite, rutile, and zircon. In some embodiments, the nanocomposite material has an average crystallite size in a range from 20 to 115 nm, preferably 40 to 95 nm, preferably 50 to 85 nm, preferably 55 to 75 nm, preferably 65 to 70 nm. In a preferred embodiment, the nanocomposite material has an average crystallite size of 67.50 nm.

In some embodiments, the nanocomposite material is porous. Pores may be micropores, mesopores, macropores, and/or a combination thereof. The pores exist in the bulk material, not necessarily in the molecular structure of the material. The term 'microporous' means that nanocomposite have pores with an average pore width (i.e. diameter) of less than 2 nm. The term 'mesoporous' means the pores of the nanocomposite have an average pore width of 2-50 nm. The term 'macroporous' means the pores of nanocomposite have an average pore width larger than 50 nm. Pore size may be determined by methods including, but not limited to, gas adsorption (e.g. $N_2$ adsorption), mercury intrusion porosimetry, and imaging techniques such as scanning electron microscopy (SEM), and X-ray computed tomography (XRCT).

In some embodiments, the nanocomposite material consists essentially of sheet morphologies, preferably nanosheets, although other morphologies such as nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars, tetrapods, and their mixtures thereof are also possible. In a preferred embodiment, nanocomposite material has irregularly shaped granular and flake-like particle morphology.

In some embodiments, the nanocomposite material has an oxygen content in a range from 30 to 90 atomic % (at. %), preferably 40 to 80 at. %, preferably 50 to 70 at. %, preferably 55 to 65 at. %, preferably 57 to 63 at. %, preferably 45 to 55 at. % based on the total number of atoms in the $ZnFe(BO_3)O/Fe_2CaO_4/C$ nanocomposite material. In a preferred embodiment, the nanocomposite has an oxygen content of 61.6 at. % based on the total number of atoms in the nanocomposite material.

In some embodiments, the nanocomposite material has a calcium content in a range from 0.5 to 25 at. %, preferably 1 to 20 at. %, preferably 1 to 15 at. %, preferably 5 to 10 at. %, preferably 6 to 9 at. %, based on the total number of atoms in the nanocomposite material. In a preferred embodiment, the nanocomposite material has a calcium content of 3.5 at. % based on the total number of atoms in the nanocomposite material.

In some embodiments, the nanocomposite material has an iron content in a range from 2.5 to 35 at. %, preferably 5 to 25 at. %, preferably 8 to 20 at. %, preferably 10 to 18 at. %, preferably 12 to 16 at. % based on the total number of atoms in the nanocomposite material. In a preferred embodiment, the nanocomposite material has an iron content of 14.3 at. % based on the total number of atoms in the nanocomposite material.

In some embodiments, the nanocomposite material has boron content in a range from 0.5 to 25 at. %, preferably 1 to 20 at. %, preferably 1 to 15 at. %, preferably 3 to 12 at. %, preferably 5 to 9 at. %, based on the total number of atoms in the nanocomposite material. In a preferred embodiment, the nanocomposite material has a boron content of 7.4 at. % based on the total number of atoms in the nanocomposite material.

In some embodiments, the nanocomposite material has zinc content in a range from 0.25 to 25 at. %, preferably 0.5 to 15 at. %, preferably 0.5 to 10 at. %, preferably 1 to 8 at. %, preferably 3 to 7 at. %, based on the total number of atoms in the nanocomposite material. In a preferred embodiment, the nanocomposite material has a zinc content of 5.7 at. % based on the total number of atoms in the nanocomposite material.

In some embodiments, the nanocomposite material has a carbon content in a range from 0.1 to 40 at. %, preferably 0.5 to 25 at. %, preferably 0.5 to 20 at. %, preferably 1 to 15 at. %, preferably 2 to 10 at. %, based on the total number of atoms in the nanocomposite material. In a preferred embodiment, the nanocomposite material has a carbon content of 3.5 at. % based on the total number of atoms in the nanocomposite material.

In one or more embodiments, the nanocomposite materials has a $ZnFe(BO_3)O$ content in a range from 55 to 70 weight % (wt. %), a $Fe_2CaO_4$ content in a range from 25 to 35 wt. %, and a C content in a range from 1 to 10 wt. %.

Figure 1A:
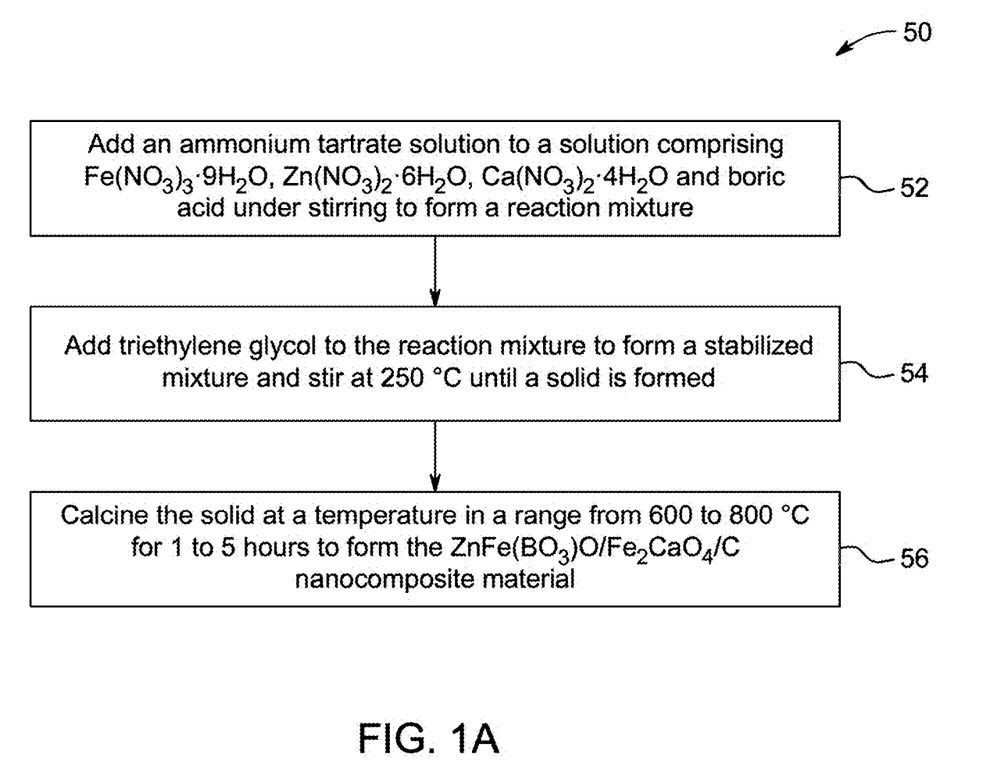
FIG. 1A illustrates an exemplary flow chart for a method of producing a $ZnFe(BO_3)O/Fe_2CaO_4/C$ nanocomposite material, according to certain embodiments.

FIG. 1A illustrates a schematic flow chart of a method 50 of preparing the $ZnFe(BO_3)O/Fe_2CaO_4/C$ nanocomposite material. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes adding an ammonium tartrate solution to a solution comprising $Fe(NO_3)_3 \cdot 9H_2O$, $Zn(NO_3)_2 \cdot 6H_2O$, $Ca(NO_3)_2 \cdot 4H_2O$ and boric acid under stirring to form a reaction mixture. In some embodiments, the concentration of ammonium tartrate in the reaction mixture is in a range from 20 to 90 g/L, preferably 40 to 70 g/L, preferably 45 to 70 g/L, preferably 50 to 70 g/L, preferably 55 to 70 g/L, preferably 60 to 70 g/L, preferably 65 to 70 g/L. In a preferred embodiment, the concentration of ammonium tartrate in the reaction mixture is 194 g/L.

The $Fe(NO_3)_3 \cdot 9H_2O$ is used as the iron salt, although in some embodiments, other iron salt may also be used, such as iron chloride, iron sulfate, iron acetate, iron phosphate, iron nitrate, iron oxide, iron oxalate, iron hydroxide, iron bromide, iron iodide, iron tartrate, iron lactate, iron citrate, iron pyrophosphate, iron benzoate, iron methanesulfonate, iron formate, iron methanearsonate, iron nitrate hexahydrate, iron dichloride, iron phosphate monohydrate, iron selenate, and iron acetylacetonate. In some embodiments, the concentration of $Fe(NO_3)_3 \cdot 9H_2O$ in the reaction mixture may range from 10 to 50 g/L, preferably 20 to 40 g/L, preferably 25 to 40 g/L, preferably 30 to 40 g/L, preferably 35 to 40 g/L. In a preferred embodiment, the concentration of $Fe(NO_3)_3 \cdot 9H_2O$ is 42.5 g/L.

$Zn(NO_3)_2 \cdot 6H_2O$ is used as the zinc salt, although in some embodiments, other zinc salts may also be used, such as zinc chloride, zinc acetate, zinc sulfate, zinc oxide, zinc carbonate, zinc nitrate, zinc bromide, zinc iodide, zinc sulfate heptahydrate, zinc chloride hexahydrate, zinc acetate dihydrate, zinc nitrate tetrahydrate, zinc thiocyanate, zinc formate, zinc methanesulfonate, zinc isothiocyanate, zinc citrate, zinc pyrophosphate, zinc orthophosphate, zinc laurate, zinc stearate, zinc benzoate, zinc salicylate, zinc hydroxide, zinc peroxysulfate, zinc tartrate, zinc lactate, zinc picrate, zinc gluconate, and zinc ascorbate. In some embodiments, the concentration of $Zn(NO_3)_2 \cdot 6H_2O$ in the reaction mixture may range from 2.5 to 25 g/L, preferably 5 to 15 g/L, preferably 7 to 15 g/L, preferably 9 to 15 g/L, preferably 12 to 15 g/L. In a preferred embodiment, the concentration of $Zn(NO_3)_2 \cdot 6H_2O$ is 15.5 g/L.

$Ca(NO_3)_2 \cdot 4H_2O$ is used as the calcium salt, although in some embodiments, other calcium salts may also be used, such as calcium chloride, calcium sulfate, calcium carbonate, calcium hydroxide, calcium oxide, calcium acetate, calcium citrate, calcium lactate, calcium gluconate, calcium phosphate, calcium ascorbate, calcium benzoate, calcium malate, calcium fumarate, calcium oxalate, calcium stearate, calcium tartrate, calcium salicylate, calcium formate, calcium propionate, calcium valerate, calcium succinate, calcium iodide, calcium bromide, calcium fluoride, calcium thiocyanate, calcium perchlorate, calcium chromate, calcium molybdate, and calcium tungstate. In some embodiments, the concentration of $Ca(NO_3)_2 \cdot 4H_2O$ in the reaction mixture is in a range from 2.5 to 25 g/L, preferably 5 to 15 g/L, preferably 7 to 15 g/L, preferably 9 to 15 g/L, preferably 12 to 15 g/L. In a preferred embodiment, the concentration of $Ca(NO_3)_2 \cdot 4H_2O$ is 12.4 g/L.

Boric acid is used as a boron source, although in some embodiments, other boron sources such as boron oxide, boron nitride, boron carbide, sodium borate, lithium borate, potassium borate, calcium borate, magnesium borate, zinc borate, ammonium borate, aluminum borate, iron borate, cobalt borate, nickel borate, manganese borate, bismuth borate, strontium borate, lanthanum borate, cerium borate, yttrium borate, zirconium borate, boron trifluoride, boron trichloride, boron tribromide, boron phosphate, boron sulfate, tetraethyl orthoborate, trimethyl borate, triethyl borate, triphenyl borate, etc, may also be used. In some embodiments, the concentration of boric acid in the reaction mixture may range from 5 to 35 g/L, preferably 15 to 25 g/L, preferably 17 to 25 g/L, preferably 19 to 25 g/L, preferably 22 to 25 g/L. In a preferred embodiment, the concentration of boric acid is 28 g/L.

At step 54, the method 50 includes adding triethylene glycol to the reaction mixture to form a stabilized mixture and stirring at 250° C. until a solid is formed. In some embodiments, the concentration of triethylene glycol in the stabilized mixture is in a range from 10 to 100 ml per liter, preferably 30 to 40 ml per liter, preferably 32 to 40 ml per liter, preferably 34 to 40 ml per liter, preferably 36 to 40 ml per liter, preferably 38 to 40 ml per liter of stabilized mixture. In a preferred embodiment, the concentration of triethylene glycol in the stabilized mixture is 35 ml per liter of stabilized mixture.

At step 56, the method 50 includes calcining the solid at a temperature in a range from 600 to 800° C. for 1 to 5 hours to form the $ZnFe(BO_3)O/Fe_2CaO_4/C$ nanocomposite material. In some embodiments, the solid is calcined at a temperature in a range from 600 to 800° C., preferably 650 to 800° C., preferably 700 to 800° C., preferably 750 to 800° C., preferably 650 to 750° C. In a preferred embodiment, the solid is calcined at 700° C. In some embodiments, the solid is calcined for 1 to 5 hours, preferably 1.5 to 5 hours, preferably 2 to 5 hours, preferably 2.5 to 5 hours, preferably 3 to 5 hours, preferably 3.5 to 5 hours, preferably 4 to 5 hours, preferably 4.5 to 5 hours, preferably 2 to 4 hours. In a preferred embodiment, the solid is calcined for 3 hours.

The following examples are provided solely for illustration and are not to be construed as limitations of the present disclosure, as many variations thereof are possible without departing from the spirit and scope of the present disclosure.

EXAMPLES

The following examples demonstrate a $ZnFe(BO_3)O/Fe_2CaO_4/C$ nanocomposite material and a method of production thereof. The examples are provided solely for illustration and are not to be construed as limitations of the present disclosure, as many variations thereof are possible without departing from the spirit and scope of the present disclosure.

Example 1: Synthesis of $ZnFe(BO_3)O/Fe_2CaO_4/C$ Nanocomposite

Figure 1B:
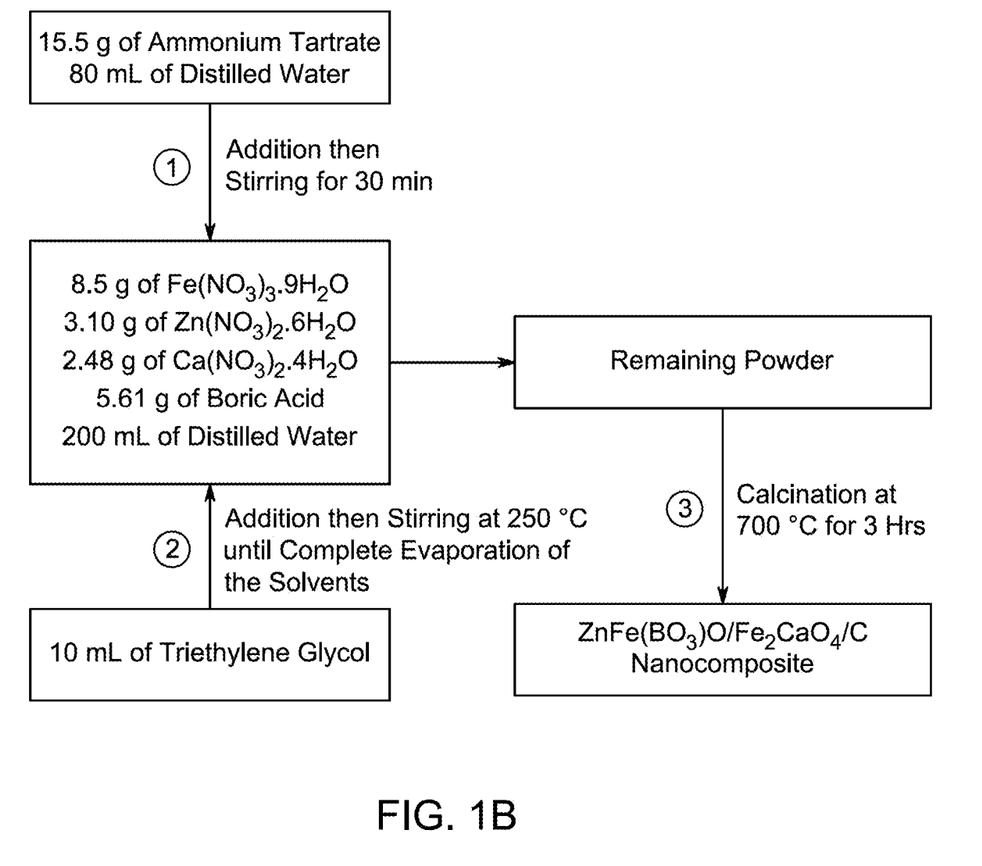
FIG. 1B illustrates an exemplary block diagram depicting the method of producing the $ZnFe(BO_3)O/Fe_2CaO_4/C$ nanocomposite material, according to certain embodiments.

According to the present disclosure, the $ZnFe(BO_3)O/Fe_2CaO_4/C$ nanocomposite was synthesized using a Pechini sol-gel method, as described in FIG. 1B. In particular, 15.5 grams (g) of ammonium tartrate ($C_4H_{12}N_2O_6$) was dissolved in 80 mL of distilled water (DW). Further, 8.5 g of $Fe(NO_3)_3 \cdot 9H_2O$, 3.10 g of $Zn(NO_3)_2 \cdot 6H_2O$, 2.48 g of $Ca(NO_3)_2 \cdot 4H_2O$, and 5.61 g of boric acid ($H_3BO_3$) were dissolved in 200 milliliters (mL) of distilled water. The ammonium tartrate solution prepared in the first step was gradually added to the second solution with continuous stirring for 30 minutes. Subsequently, 10 mL of triethylene glycol (TEG, $C_6H_{14}O_4$) was introduced into the combined solution under continuous stirring at 250° C. until complete solvent evaporation. The resultant solid was collected and calcined at 700° C. for 3 hours to obtain the $ZnFe(BO_3)O/Fe_2CaO_4/C$ nanocomposite.

Figure 2:
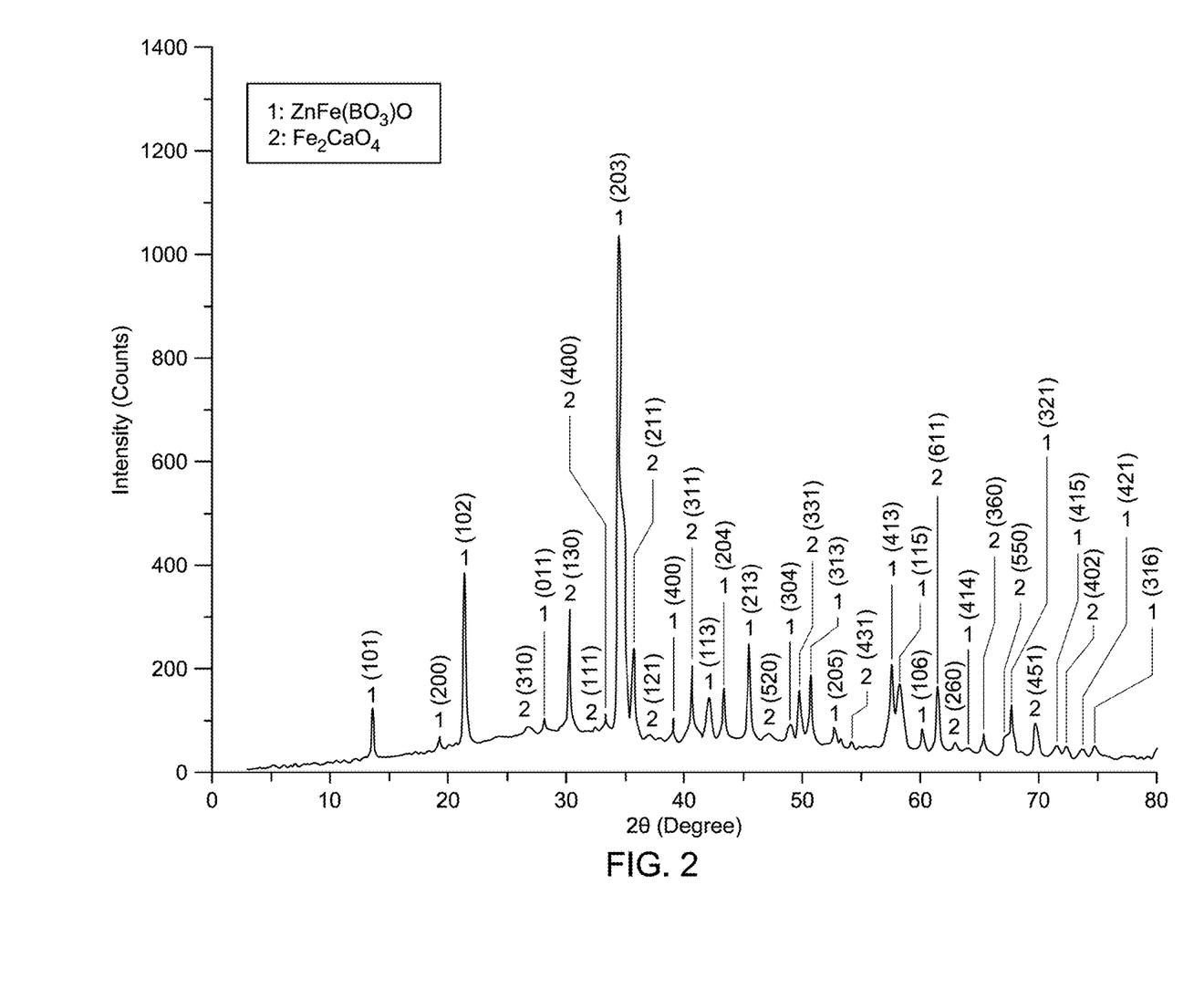
FIG. 2 is a graph depicting X-ray diffraction (XRD) pattern of the $ZnFe(BO_3)O/Fe_2CaO_4/C$ nanocomposite material, according to certain embodiments.

X-ray diffraction (XRD) patterns for the nanocomposite are shown in FIG. 2. In particular, FIG. 2 depicts the structural and crystallographic properties of the $ZnFe(BO_3)O/Fe_2CaO_4/C$ nanocomposite components, as listed in Table 1. The nanocomposite identified zinc iron borate oxide (ZnFe(BO_3)O), a JCPDS card (No. 01-085-0146), and iron calcium oxide ($Fe_2CaO_4$), identified using card number JCPDS (No. 01-074-2136), both of which exhibited an orthorhombic crystal system. The diffraction peaks for ZnFe (BO$_3$)O were observed at 2θ values of 13.53°, 19.19°, 21.30°, 28.11°, 34.62°, 38.92°, 41.97°, 43.23°, 45.44°, 48.79°, 50.67°, 52.68°, 57.60°, 58.24°, 60.01°, 63.80°, 67.58°, 71.55°, 73.56°, and 74.71°, corresponding to the Miller indices (101), (200), (102), (011), (203), (400), (113), (204), (213), (304), (313), (205), (413), (115), (106), (414), (321), (415), (421), and (316), respectively. The diffraction peaks for Fe$_2$CaO$_4$ were observed at 2θ angles of 26.65°, 30.22°, 32.32°, 33.25°, 35.57°, 36.94°, 40.60°, 46.89°, 49.63°, 54.14°, 61.38°, 62.75°, 65.26°, 67.05°, 69.68°, and 72.19°, corresponding to the Miller indices (310), (130), (111), (400), (211), (121), (311), (520), (331), (431), (611), (260), (360), (550), (451), and (402), respectively. The nanocomposite exhibited an average crystallite size of 67.50 nm.

TABLE 1

Structural and crystallographic properties of the nanocomposite components, as determined by XRD.

| Components of the nanocomposite | | | | Average crystallite size of the nanocomposite (nm) |
|---|---|---|---|---|
| Phase | Chemical name | Card No. | Crystal system | |
| ZnFe(BO$_3$)O | Zinc iron borate oxide | JCPDS-01-085-0146 | Orthorhombic | 67.50 |
| Fe$_2$CaO$_4$ | Iron calcium oxide | JCPDS-01-074-2136 | Orthorhombic | |

Figure 3:
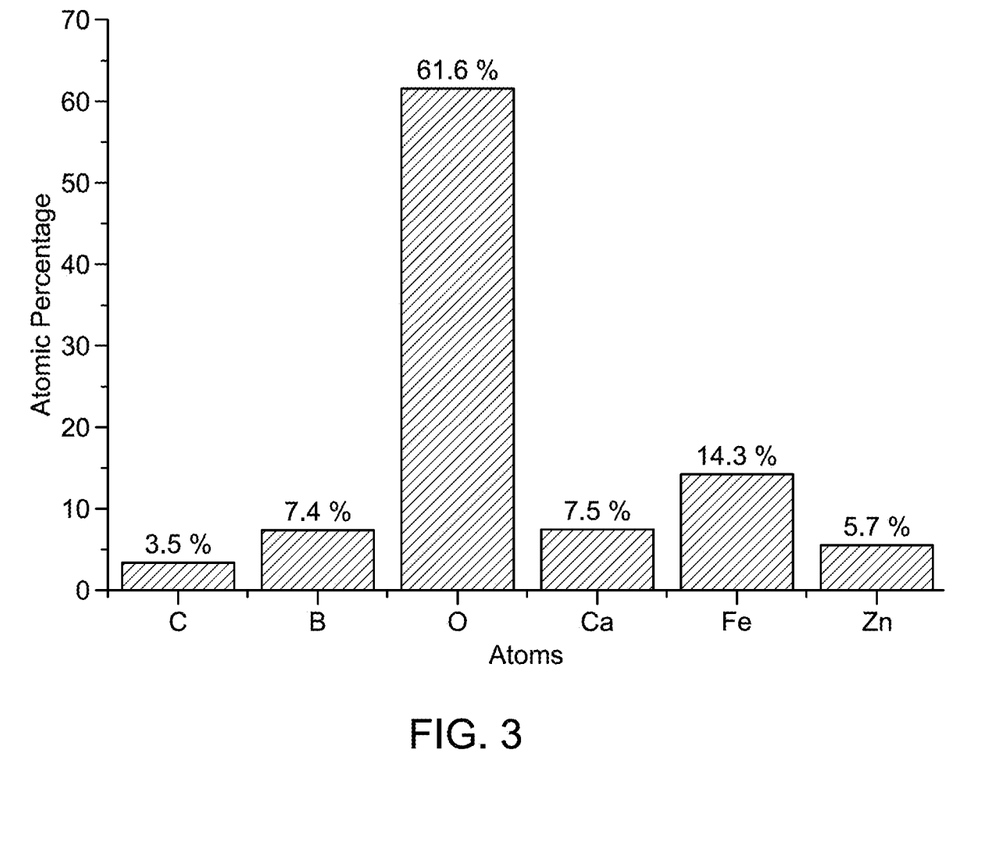
FIG. 3 is a graph depicting the distribution of atomic percentages of elements in the $ZnFe(BO_3)O/Fe_2CaO_4/C$ nanocomposite material, as determined by energy dispersive X-ray spectroscopy (EDX), according to certain embodiments.

Further, FIG. 3 illustrates the elemental distribution of the ZnFe(BO$_3$)O/Fe$_2$CaO$_4$/C nanocomposite as determined by energy dispersive X-ray spectroscopy (EDX). The atomic percentages of the elements were determined as 3.5% carbon (C), 7.4% boron (B), 61.6% oxygen (O), 7.5% calcium (Ca), 14.3% iron (Fe) and 5.7% zinc (Zn). The oxygen content was attributed to the oxide phases in the nanocomposite, while the presence of carbon was due to the use of ammonium tartrate and triethylene glycol during the synthesis process via the Pechini sol-gel method, as these components contributed residual carbon in the final product. The uniform distribution of elements confirmed the successful synthesis of the nanocomposite.

Figure 4:
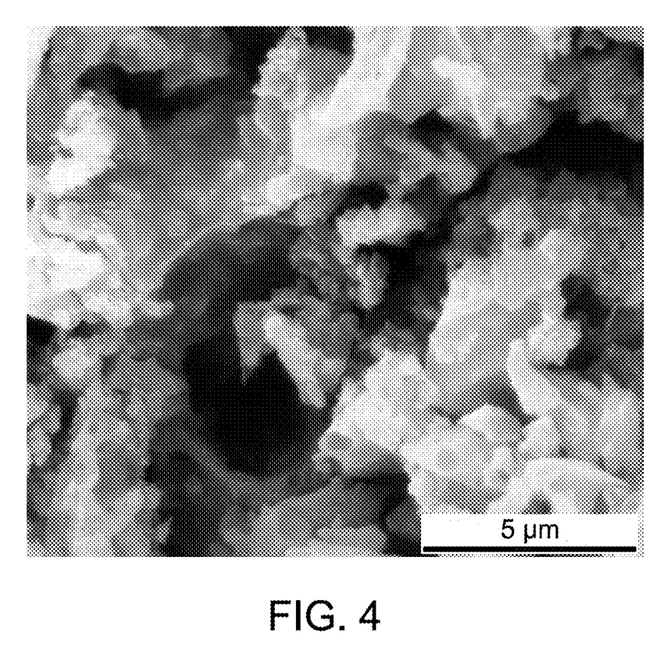
FIG. 4 shows a scanning electron microscope (SEM) image of the $ZnFe(BO_3)O/Fe_2CaO_4/C$ nanocomposite material, at a magnification of 5 micrometer (μm), according to certain embodiments.

The scanning electron microscope (SEM) image of the ZnFe(BO$_3$)O/Fe$_2$CaO$_4$/C nanocomposite revealed the porous morphology with a heterogeneous distribution of particles, as shown in FIG. 4. In particular, FIG. 4 depicts irregularly shaped agglomerates composed of granular and flake-like structures, along with an interconnected porous morphology. These structural features indicated a heterogeneous distribution of the synthesized material, which confirmed the successful formation of the nanocomposite with distinct morphological characteristics.

Figure 5:
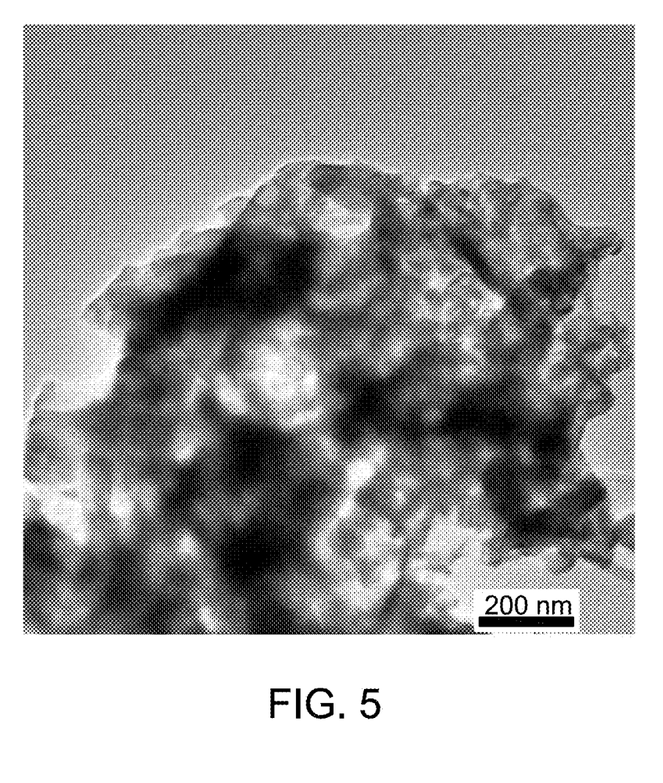
FIG. 5 shows a high-resolution transmission electron microscope (HRTEM) image of the $ZnFe(BO_3)O/Fe_2CaO_4/C$ nanocomposite material, at a magnification of 200 nanometer (nm), according to certain embodiments.

A high-resolution transmission electron microscope (HR-TEM) image of the ZnFe(BO$_3$)O/Fe$_2$CaO$_4$/C nanocomposite is depicted in FIG. 5. The obtained image identified the nanoscale morphology. In particular, FIG. 5 shows a mixture of spherical and irregularly shaped nanoparticles embedded within a network of interconnected clusters. The observed shapes indicate a crystalline nature of the particles, with clear edges and boundaries suggesting good particle dispersion. The HRTEM analysis confirmed the successful synthesis of the nanocomposite with well-defined structural and morphological features.

The aspects of the present disclosure provide the ZnFe(BO$_3$)O/Fe$_2$CaO$_4$/C nanocomposite synthesized using the Pechini sol-gel method, characterized by uniform element distribution, high crystallinity, and a well-defined orthorhombic crystal structure, as confirmed by XRD and TEM analysis. The presence of carbon, resulting from the use of ammonium tartrate and triethylene glycol during synthesis, enhances the structural integrity and performance of the material. The present disclosure addresses challenges associated with traditional methods by offering a facile, cost-effective, and scalable approach for synthesizing high-performance nanocomposites, marking an advancement in materials science.

The present disclosure provides a ZnFe(BO$_3$)O/Fe$_2$CaO$_4$/C nanocomposite synthesized using the Pechini sol-gel method, characterized by a multi-phase crystalline structure and desirable physicochemical properties. XRD confirmed the presence of orthorhombic ZnFe(BO$_3$)O and Fe$_2$CaO$_4$ phases, with an average crystallite size of 67.50 nm. SEM analysis revealed a heterogeneous morphology with granular and flake-like structures, contributing to a high surface area and structural uniformity. EDX spectroscopy determined the elemental composition as 61.6% oxygen (O), 14.3% iron (Fe), 7.5% calcium (Ca), 7.4% boron (B), 5.7% zinc (Zn), and 3.5% carbon (C), with carbon originating from ammonium tartrate and triethylene glycol used during synthesis. HRTEM images provided further evidence of the crystalline nature, showing spherical and irregularly shaped nanoparticles interconnected within the composite. The novelty of the present disclosure is established by the composition of the nanocomposite, structural integrity, and the efficient, scalable synthesis process, which collectively establish the ZnFe(BO$_3$)O/Fe$_2$CaO$_4$/C nanocomposite as a groundbreaking material for advanced applications.

The ZnFe(BO$_3$)O/Fe$_2$CaO$_4$/C nanocomposite holds potential for commercial applications in environmental remediation, particularly for the adsorption and removal of heavy metals and pollutants from water. The structural and compositional properties make it suitable for use in advanced catalysis, including chemical reactions requiring high stability and efficiency. In addition, the nanocomposite material may be applied in energy storage and conversion devices, such as batteries or supercapacitors, due to its promising electrical and thermal characteristics.

Numerous modifications and variations of the present disclosure are possible in light of the above teachings. It is, therefore, to be understood that within the scope of the appended claims, the disclosure may be practiced otherwise than as specifically described herein.

The invention claimed is:

1. A ZnFe(BO$_3$)O/Fe$_2$CaO$_4$/C nanocomposite material, comprising:
   an orthorhombic ZnFe(BO$_3$)O phase; and
   an orthorhombic Fe$_2$CaO$_4$ phase,
   wherein the ZnFe(BO$_3$)O/Fe$_2$CaO$_4$/C nanocomposite material comprises irregularly shaped granular and flake-like particles.

2. The ZnFe(BO$_3$)O/Fe$_2$CaO$_4$/C nanocomposite material of claim 1, wherein the ZnFe(BO$_3$)O/Fe$_2$CaO$_4$/C nanocomposite material has an oxygen content in a range from 40 to 80 atomic % (at. %), a calcium content in a range from 1 to 20 at. %, an iron content in a range from 5 to 25 at. %, a boron content in a range from 1 to 20 at. %, a zinc content in a range from 0.5 to 15 at. %, and a carbon content in a range from 0.5 to 25 at. % based on the total number of atoms in the ZnFe(BO$_3$)O/Fe$_2$CaO$_4$/C nanocomposite material.

3. The ZnFe(BO$_3$)O/Fe$_2$CaO$_4$/C nanocomposite material of claim 2, wherein the ZnFe(BO$_3$)O/Fe$_2$CaO$_4$/C nanocomposite material has an oxygen content in a range from 50 to 70 atomic % (at. %), a calcium content in a range from 1 to 15 at. %, an iron content in a range from 8 to 20 at. %, a boron content in a range from 1 to 15 at. %, a zinc content in a range from 0.5 to 10 at. %, and a carbon content in a range from 0.5 to 20 at. % based on the total number of atoms in the ZnFe(BO$_3$)O/Fe$_2$CaO$_4$/C nanocomposite material.

4. The ZnFe(BO$_3$)O/Fe$_2$CaO$_4$/C nanocomposite material of claim 3, wherein the ZnFe(BO$_3$)O/Fe$_2$CaO$_4$/C nanocomposite material has an oxygen content in a range from 55 to 65 atomic % (at. %), a calcium content in a range from 5 to 10 at. %, an iron content in a range from 10 to 18 at. %, a boron content in a range from 3 to 12 at. %, a zinc content in a range from 1 to 8 at. %, and a carbon content in a range from 1 to 15 at. % based on the total number of atoms in the ZnFe(BO$_3$)O/Fe$_2$CaO$_4$/C nanocomposite material.

5. The ZnFe(BO$_3$)O/Fe$_2$CaO$_4$/C nanocomposite material of claim 4, wherein the ZnFe(BO$_3$)O/Fe$_2$CaO$_4$/C nanocomposite material has an oxygen content in a range from 57 to 63 atomic % (at. %), a calcium content in a range from 6 to 9 at. %, an iron content in a range from 12 to 16 at. %, a boron content in a range from 5 to 9 at. %, a zinc content in a range from 3 to 7 at. %, and a carbon content in a range from 2 to 10 at. %.

6. The ZnFe(BO$_3$)O/Fe$_2$CaO$_4$/C nanocomposite material of claim 1, wherein the ZnFe(BO$_3$)O/Fe$_2$CaO$_4$/C nanocomposite material has an average crystallite size in a range from 40 to 95 nm.

7. The ZnFe(BO$_3$)O/Fe$_2$CaO$_4$/C nanocomposite material of claim 6, wherein the ZnFe(BO$_3$)O/Fe$_2$CaO$_4$/C nanocomposite material has an average crystallite size in a range from 50 to 85 nm.

8. The ZnFe(BO$_3$)O/Fe$_2$CaO$_4$/C nanocomposite material of claim 1, wherein the ZnFe(BO$_3$)O/Fe$_2$CaO$_4$/C nanocomposite material has an average crystallite size in a range from 55 to 75 nm.

9. The ZnFe(BO$_3$)O/Fe$_2$CaO$_4$/C nanocomposite material of claim 1, wherein the ZnFe(BO$_3$)O/Fe$_2$CaO$_4$/C nanocomposite material has an average crystallite size in a range from 65 to 70 nm.

10. A method for making the ZnFe(BO$_3$)O/Fe$_2$CaO$_4$/C nanocomposite material of claim 1, comprising:
adding an ammonium tartrate solution to a solution comprising Fe(NO$_3$)$_3$·9H$_2$O, Zn(NO$_3$)$_2$·6H$_2$O, Ca(NO$_3$)$_2$·4H$_2$O and boric acid under stirring to form a reaction mixture;
adding triethylene glycol to the reaction mixture to form a stabilized mixture and stirring at 250° C. until a solid is formed; and
calcining the solid at a temperature in a range from 600 to 800° C. for 1 to 5 hours to form the ZnFe(BO$_3$)O/Fe$_2$CaO$_4$/C nanocomposite material.

11. The method of claim 10, wherein the concentration of ammonium tartrate in the reaction mixture is in a range from 40 to 70 g/L.

12. The method of claim 10, wherein the concentration of Fe(NO$_3$)$_3$·9H$_2$O in the reaction mixture is in a range from 20 to 40 g/L.

13. The method of claim 10, wherein the concentration of Zn(NO$_3$)$_2$·6H$_2$O in the reaction mixture is in a range from 5 to 15 g/L.

14. The method of claim 10, wherein the concentration of Ca(NO$_3$)$_2$·4H$_2$O in the reaction mixture is in a range from 5 to 15 g/L.

15. The method of claim 10, wherein the concentration of boric acid in the reaction mixture is in a range from 15 to 25 g/L.

16. The method of claim 10, wherein the concentration of triethylene glycol in the stabilized mixture is in a range from 30 to 40 ml per liter of stabilized mixture.

17. The method of claim 10, wherein the solid is calcined at a temperature in a range from 650 to 750° C.

18. The method of claim 17, wherein the solid is calcined at a temperature of 700° C.

19. The method of claim 10, wherein the solid is calcined for 2 to 4 hours.

20. The method of claim 19, wherein the solid is calcined for 3 hours.

\* \* \* \* \*